May 9, 1950

G. W. MARTIN 2,507,034

OUTBOARD MOTOR UNIT

Filed Sept. 18, 1946

Inventor
George W. Martin
By Bruer Jackson Boutche, Denver
Attys.

May 9, 1950

G. W. MARTIN 2,507,034

OUTBOARD MOTOR UNIT

Filed Sept. 18, 1946

Inventor:
George W. Martin
By Brown Jackson Boettcher Dienner
Attys.

Fig. 12.

May 9, 1950 G. W. MARTIN 2,507,034
OUTBOARD MOTOR UNIT
Filed Sept. 18, 1946 8 Sheets-Sheet 8

Inventor:
George W. Martin.
By Brown Jackson Boettcher Dienner
Attys.

Patented May 9, 1950

2,507,034

UNITED STATES PATENT OFFICE 2,507,034

OUTBOARD MOTOR UNIT

George W. Martin, Eau Claire, Wis.

Application September 18, 1946, Serial No. 697,732

10 Claims. (Cl. 115—17)

This invention relates to units comprising an internal combustion engine as the power source, and has to do more particularly with outboard motor units.

Outboard motor units are well known and extensively used. The known units with which I am familiar, particularly the engines thereof, are needlessly complicated and expensive to make, have parts not readily accessible for repair or replacement, require time and care in their assembly and disassembly, do not give ready access to the interior of the water jackets for cleaning thereof, and employ water tubes or conduits disposed exteriorly of the engine and its associated support tube so as to present objectionable projections while being exposed to damage.

My invention is directed to the provision of an outboard motor unit which avoids the above noted objections to the known units referred to. To that end, I provide an outboard motor unit having an engine of light weight and simple construction which, in the main, may readily be die cast, which is conducive to low cost production, may be assembled and disassembled with expedition and facility, and gives ready access to all parts for replacement or repair and to the water jackets for cleaning thereof, such unit avoiding the use of exposed tubes or like water conduits. I also provide a simple and highly efficient arrangement whereby the exhaust gases may be delivered from the cylinder block directly to the mounting plate at the upper end of the motor support tube without necessity for providing a supplementary exhaust gas conduit, while effectively eliminating objectionable back pressure. A further advantage of my invention resides in the provision of improved means for mounting the water supply tube, leading from the discharge of the underwater pump to the water inlet of the engine cooling system, whereby that tube may be quickly removed and replaced when desired or necessary. I also provide means whereby the drive shaft, extending from the engine downward through the engine support tube, is effectively shielded from the exhaust gases by the cooling water discharged from the cylinder water jacket, and the exhaust gases are quickly condensed and entrained by the water flowing down the exhaust tube to an underwater discharge, thereby effectively avoiding objectionable back pressure in the engine exhaust passages. Further objects and advantages of my invention will appear from the detail description.

In the drawings:

Figure 4 is a plan view of the engine, with the fly-wheel and associated parts omitted and the crank shaft shown in section, and the spark plugs broken away, the engine accessories being omitted for clearness of illustration;

I have illustrated my invention, by way of example, as embodied in an outboard motor unit utilizing a two cylinder two cycle internal combustion engine of the horizontal type, i. e., an engine mounted with the cylinders thereof disposed horizontally, as is usual in outboard motor units. It is to be understood, however, that my invention is also applicable to engines having one or any suitable number of cylinders and, in its broader aspects, to vertical cylinder engines, and that the terms, "horizontal," "upper," "lower" and "side," as used in this specification and the appended claims, with reference to a horizontal engine, are used for convenience of description and are to be so construed and not in a limiting sense as to the substance of my invention.

Figure 1:
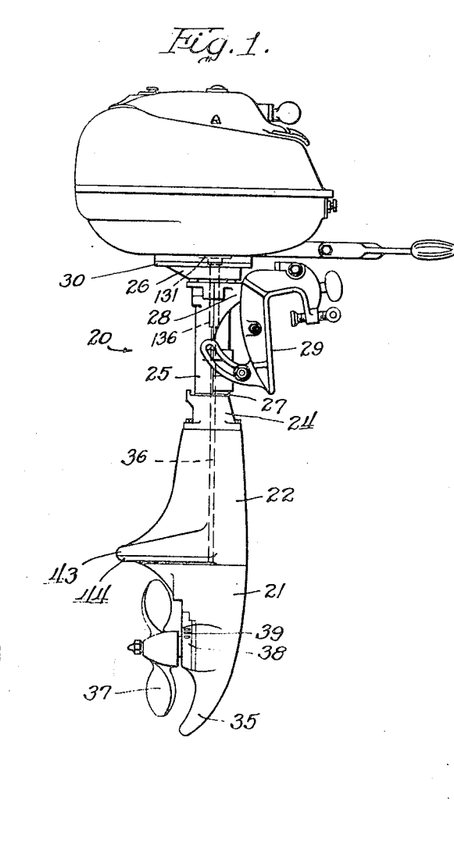
Figure 1 is an isometric side view of an outboard motor unit embodying my invention.

The outboard motor unit 20 shown in Figure 1 comprises an underwater section 21, an intermediate section 22, and an upper section comprising a motor support tube 23 having a flanged fitting 24 fixed to its lower end. The sections 21 and 22 are secured together and to fitting 24 in a suitable manner, conveniently by bolting, as is known. A bearing sleeve 25, formed of two sections bolted together, fits about the support tube 23, between a mounting plate 26 fixed on the upper end of tube 23 and the fitting 24, there being a washer 27 between the lower end of sleeve 25 and the upper end of fitting 24. An arm 28, rigid with the upper end of sleeve 25, carries a clamp bracket 29 suitably mounted thereon, by means of which the unit may be secured to the stern sill or transom of a boat. When the unit is mounted on a boat, the sleeve 25 supports tube 23 and the parts carried thereby for turning movement about the axis of the tube.

The mounting plate 26 is of dished formation, open at its top, where it is provided with an outwardly extending peripheral flange 30, and is of substantial depth interiorly opening directly into the upper end of motor support tube 23. Flange 30 is of generally elliptical shape in plan and has its upper surface machined to provide a seating surface 31 of generally elliptical shape, as is shown more clearly in Figure 13. At its under face, mounting plate 26 is provided with downwardly opening recesses (Figure 12) carrying elements 32 cooperating with elements 33 carried by a flange 34 at the upper end of sleeve 25. The elements 32 and 33 are included in steering stabilizing means for holding tube 23 in desired adjustment about its axis. The stabilizing means referred to is not included in my instant invention, constitutes the subject matter of my U. S. Patent No. 2,462,272, and need not be further described here.

Figures 8, 15:
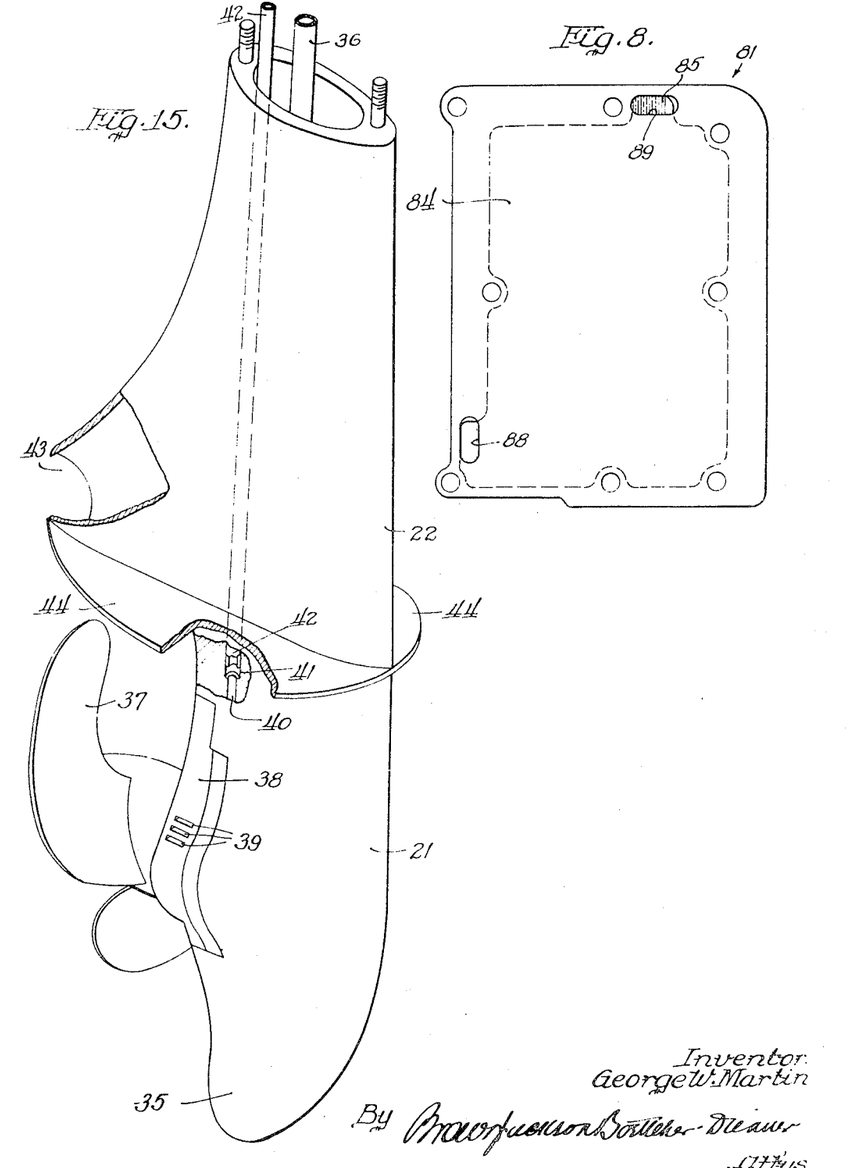
Figure 8 is an inner face view of the expansion chamber cover structure.
Figure 15 is an isometric view of the intermediate and lower sections and associated parts, of the outboard unit on an enlarged scale, with certain parts broken away and shown in section.

The lower section 21 of unit 20 is provided with the usual skeg 35 (Figure 1) extending downward therefrom. This section 21 houses the gearing and associated parts for driving the propeller shaft, mounted therein, from a drive shaft 36 (Figures 12 and 15) extending from the power head downward through motor support tube 23 and the intermediate section 22. The propeller shaft (not shown) is rotatably mounted in section 21, projects outwardly therebeyond and has suitably mounted thereon a propeller 37. Section 21 also carries a water pump 38 (Figure 15), of suitable known type, having an underwater intake 39 opening through one side of section 21. A discharge passage 40 leads from the discharge of pump 38 and opens into the lower end of a bore 41 extending through the upper end of section 21. A water supply tube 42, preferably formed of aluminum, fits snugly at its lower end in bore 40 and extends upward therefrom through intermediate section 22 and support tube 23, alongside the drive shaft 36. The upper end of tube 42 communicates with the water spaces of the engine of the power head for supplying cooling water thereto, as will appear more fully presently. The intermediate section 22 of unit 21 flares downward and is provided, at the stern thereof, with an underwater discharge opening 43 of substantial size, adjacent anti-cavitation plates 44 at the lower end and opposite sides of section 22.

Figure 2:
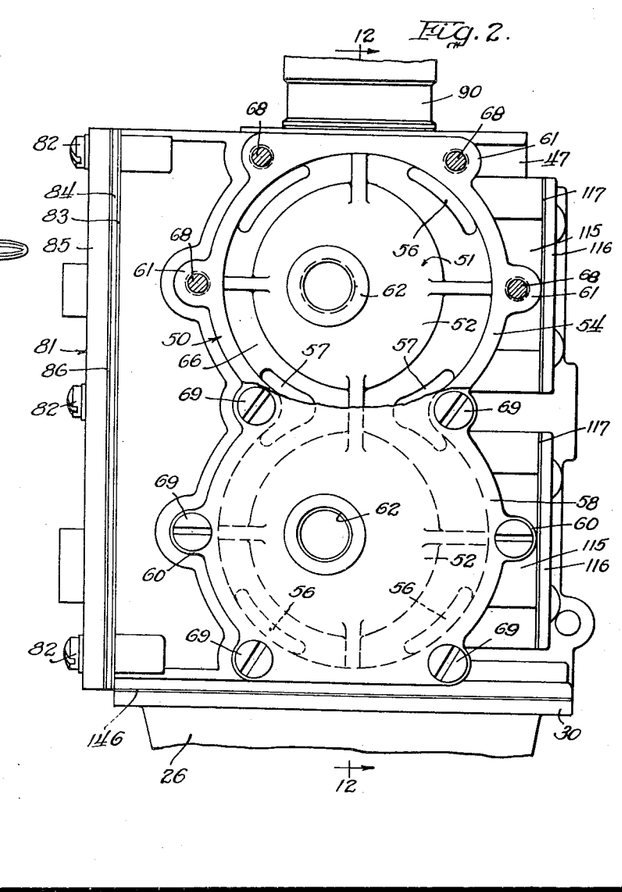
Figure 2 is an end view of the engine of the unit of Figure 1, with the cylinder head cover plate partly broken away, certain other parts being broken away and the engine accessories, including the spark plugs, being omitted for clearness of illustration.

The mounting plate 26 carries the power head, including the engine and its accessories. Since my instant invention has to do particularly with the engine, so far as the power head is concerned, in the accompanying drawings I have omitted the engine accessories as well as certain parts of the engine itself not necessary to a disclosure of my invention, for clearness of illustration. The engine 45 is shown as a two cycle two cylinder engine, with its cylinders disposed horizontally. It comprises a substantially cubiform cylinder block 46 having at one end a vertically disposed crank case section 47 (Figure 11) integral therewith, and provided with two superposed horizontal cylinders 48, with cast in liners or sleeves 49 of cast iron, extending outward from its other end. The outer ends of the cylinders 48 are closed by a cylinder head 50 comprising an outer end wall structure 51 providing two connected cupped head members 52 seating on the outer ends of cylinders 48 in sealing engagement therewith, with an intervening sealing gasket 53. The head 50 is provided with a peripheral wall or flange 54 connected to the end wall structure 51 by a web element 55 (Figure 2) having, adjacent flange 54, a plurality of slot-like openings 56 and 57.

Figure 11:
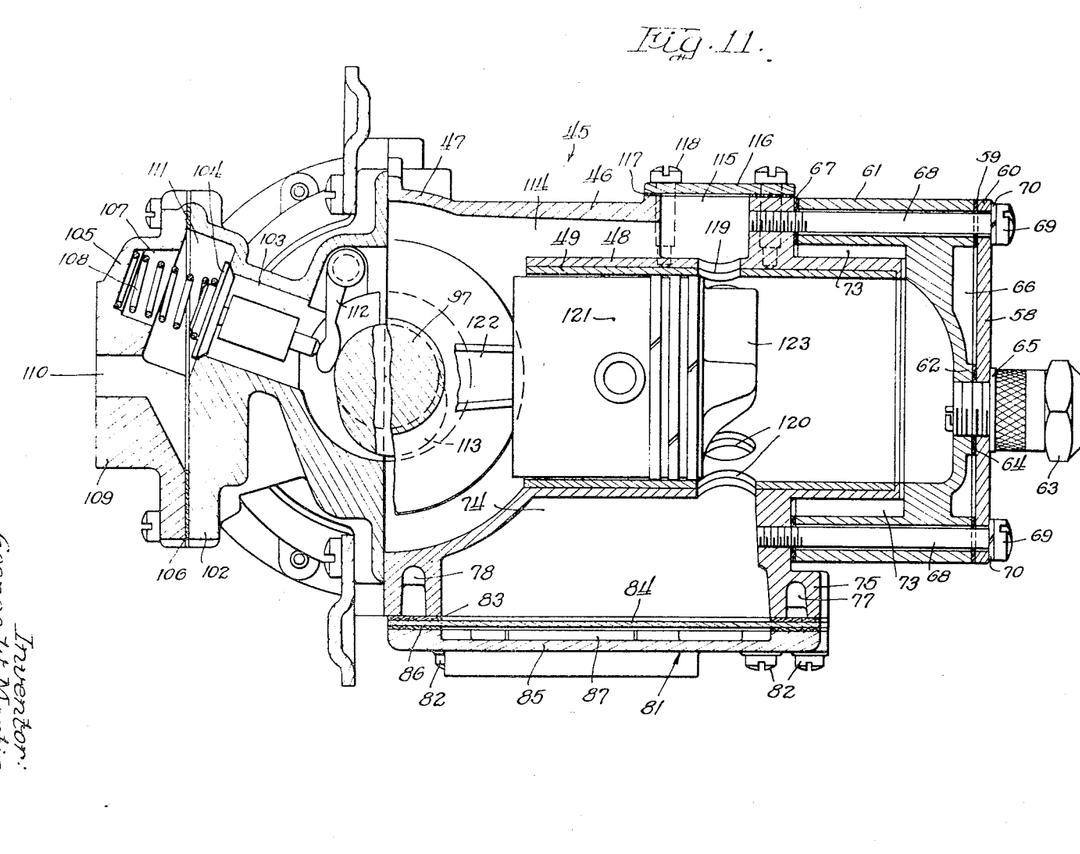
Figure 11 is a sectional view, taken substantially on line 11—11 of Figure 12, certain parts being shown in elevation and certain other parts being broken away.
Figure 12:
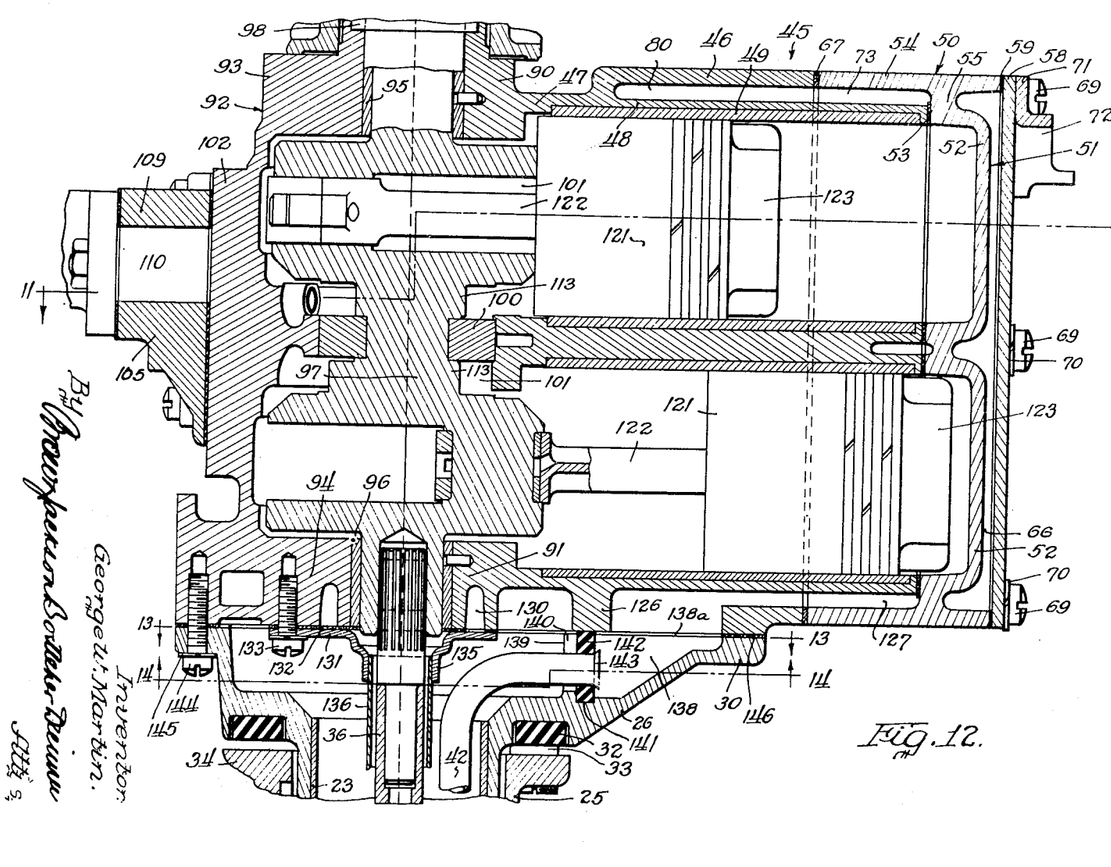
Figure 12 is a sectional view taken substantially on line 12—12 of Figure 2, certain parts being shown in elevation and certain other parts being broken away.
Figure 13:
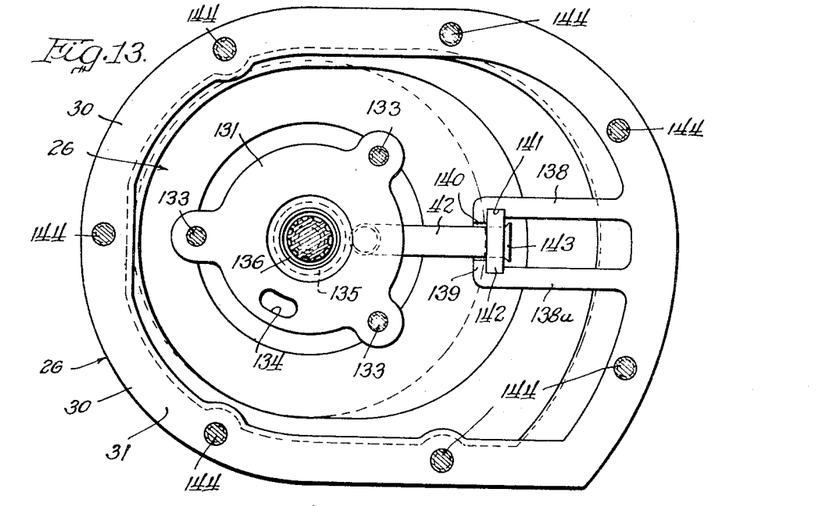
Figure 13 is a sectional view taken substantially on line 13—13 of Figure 12.
Figure 14:
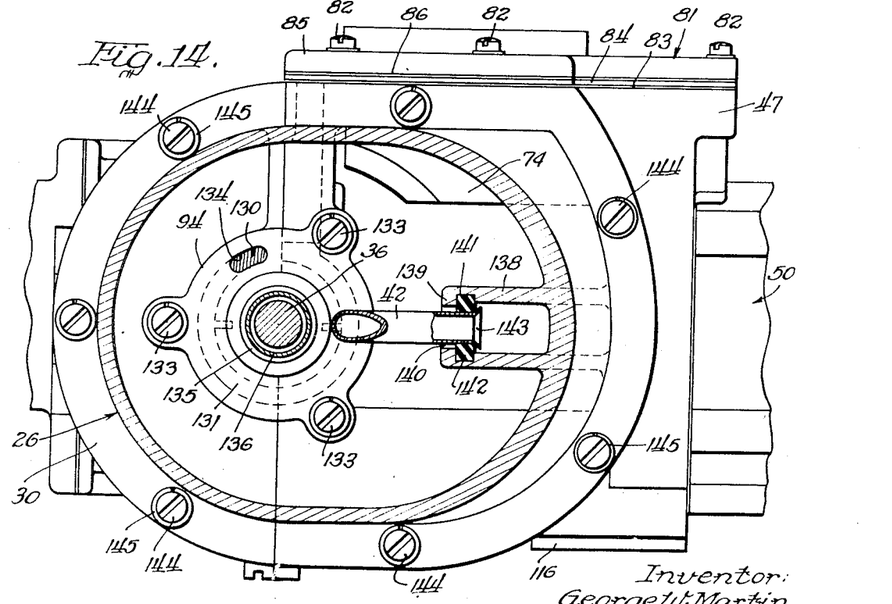
Figure 14 is a sectional view taken substantially on line 14—14 of Figure 12.

The flange 54 (Figures 11 and 12) extends outwardly a short distance beyond the end wall structure 51 and receives, at its outer end, a flat cover plate 58 seating thereon with an intervening sealing gasket 59. The plate 58 is shaped conformably to the cylinder head 50 (Figure 2) which, in outer end view, approximates a figure-8 shape, and is provided with spaced outwardly extending bolting ears 60 disposed for alignment with spaced bolting bosses 61 integral with flange 54. Each head 52 is provided with an off center outwardly extending boss 62, the outer end of which is in the plane of the outer end of flange 54. The boss 62 is suitably bored and tapped to receive the reduced neck of a spark plug 63 passing through plate 58 and screwing into boss 62, between which and the inner face of plate 58 there is interposed a sealing gasket 64 disposed about the neck of the spark plug. A sealing gasket 65 is also provided about the neck of each spark plug 63, between the body thereof and the outer face of the cylinder head cover plate 58. I thus effectively guard against possible leakage, either interiorly or exteriorly of the cylinder head, about the spark plugs, and the latter may also function as supplementary means for securing the plate 58 in position should looseness develop in the main securing means, to be referred to presently. The cover plate 58 is spaced, by flange 54, outward a short distance from the end wall structure 51 (Figures 11 and 12). Cover plate 58, the end wall structure 51, including the cylinder heads 52, and the flange 54 together define a cooling water space 66 extending across the cylinder head members 52.

The outer end of the body portion of cylinder block 46 extends outward beyond the cylinders 48 radially thereof and is machined off to provide a seating surface. Flange 54 extends from the end wall structure 51 inward along the cylinders 48 for a considerable distance, such that it seats on the seating surface of the outer end of the body portion of the cylinder block 46, with an intervening sealing gasket 67. Through bolts 68, having heads 69 at their outer ends, pass through ears 60 of cover plate 58 and the tubular bosses 61 of flange 54, and screw into the outer end of the body of cylinder block 46, appropriately bored and tapped for that purpose. Spring washers 70 are interposed between cover plate 58 and the heads 69 of certain of the bolts 68, certain others of which may pass also through a flange 71 of a shield 72, disposed at the outer face of plate 58 and extending about the upper one of the spark plugs 63. It will be seen that the bolts 68 secure cylinder head 50 in position seated on cylinder block 46 in sealing engagement therewith, and secure the cover plate 58 tightly seated on the outer end of the cylinder head flange 54, these bolts 68 constituting the main securing means, previously referred to, for the cylinder head assembly. When the cylinder head 50 is secured in position on the cylinder block 46, flange 54 is spaced outward from cylinders 48 radially thereof defining therewith a cooling water space or jacket 73 extending about the cylinders and communicating freely into head space 66 through openings 56 and 57 in web element 55.

Figures 5, 6:
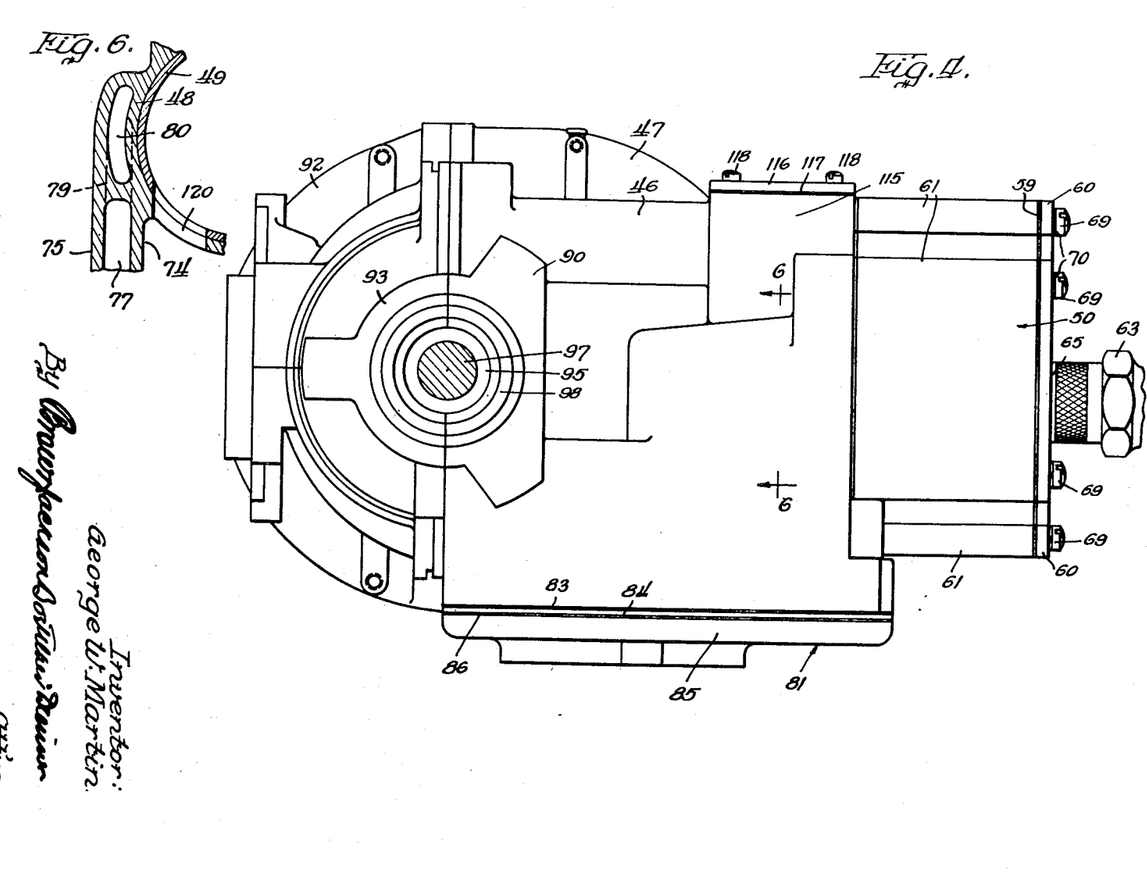
Figure 6 is a fragmentary sectional view taken substantially on line 6—6 of Figure 4.
Figures 7, 9, 10:
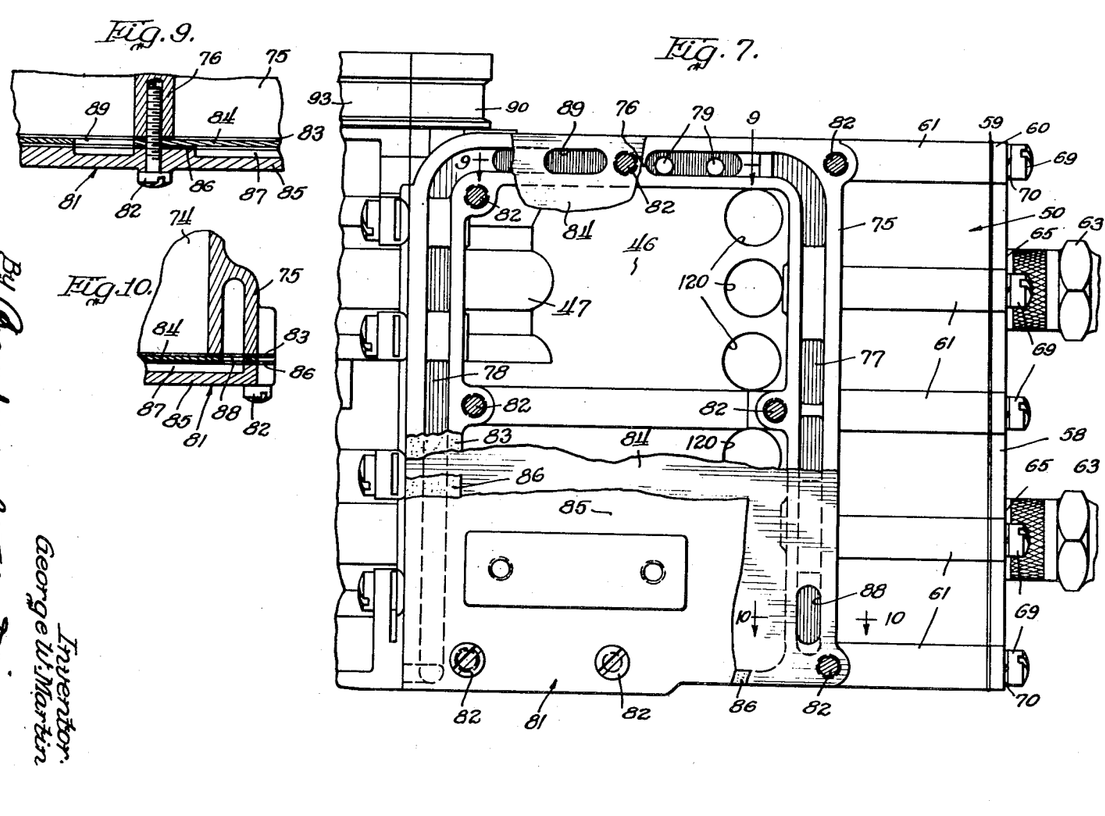
Figure 7 is a side view of the engine, taken from the exhaust side thereof, with the exhaust expansion chamber cover structure partly broken away and certain other parts broken away.
Figure 9 is a fragmentary sectional view taken substantially on line 9—9 of Figure 7.
Figure 10 is a fragmentary sectional view taken substantially on line 10—10 of Figure 7.

The cylinder block is provided, in one side thereof, with a recess 74 (Figures 7 and 11) of generally oblong shape in side view, extending to some extent about the cylinders 48 and, at its inner end, about the crank case section 47. A thickened wall 75 frames the outer opening of recess 74 and projects a short distance outward beyond the body portion of cylinder block 46. Wall 75, like recess 74, has its longer axis disposed vertically and is of channel cross section at its top and its ends. A cross web 76, at the midlength of the top element of wall 74, separates the latter interiorly into an outer channel 77 and an inner channel 78 adjacent crank case section 47. A suitable number of openings 79—one or more—are bored in the cylinder block 46, from the upper end of outer channel 77, adjacent cross web 76, into a water outlet passage 80 (Figures 6 and 12) formed in cylinder block 46 at the top thereof. The passage 80 flares toward, and opens through, the outer end of the body portion of cylinder block 46 into the cylinder water jacket 73. The passage 80 and openings 79 establish free communication between the cylinder water jacket 73 and the outer channel 77 of wall 75, as will be clear from what has been said.

The outer face of wall 75 is flat and is machined to provide a seating surface. A cover structure 81 (Figures 7, 8 and 11) is suitably secured, conveniently by screws 82, to wall 75 and seats thereon, with an intervening gasket 83 providing a water tight seal therebetween. The cover structure 81 comprises an inner flat plate 84 and an outer plate 85 of dished formation seating on plate 84, with an intervening gasket 86 providing a water tight seal therebetween. The screws 82 pass through appropriately disposed bosses of plate 85 and through plate 84, and thread into bosses of wall 75, as will readily be understood. The plates 84 and 85 define between them a water space 87. Plate 84 is provided, adjacent its bottom, at its outer end, with an opening 88 which overlies the lower end portion of channel 77 of wall 75, gasket 83 also being provided with an opening in register with opening 88. Plate 84 is also provided, at its top, with an opening 89 overlying and opening into channel 78 of wall 75, through an opening in gasket 83 in register with opening 89. It will be clear, from what has been said, that water space 87 of cover structure 81 opens into channel 77 adjacent the bottom thereof and into channel 78 at the top thereof.

The crank case section 47 is provided, at its upper end, with a semi-cylindrical boss 90 (Figures 2, 7 and 12) and, at its lower end, with a second semi-cylindrical boss 91. An outer crank case section 92 is bolted to crank case section 47 and is provided, at its upper and lower ends with semi-cylindrical bosses 93 and 94, respectively. The bosses 93 and 94 are complementary to bosses 90 and 91 and define therewith collars receiving bearing bushings 95 and 96 in which a vertical crank shaft 97 is rotatably mounted. An oil seal 98, of known type, is disposed about crank shaft 97, at the upper end of bushing 95. A center main bearing ring 100 is suitably mounted in the crank case, centrally thereof, and fits snugly in a corresponding groove in the crank shaft 97, with the shoulder at the upper side of the groove seating on ring 100, which carries the load of the crank shaft. The ring 100 and its mounting separate the crank case interiorly into two separate chambers or compartments 101 into which the cylinders 48 respectively open, at their inner ends. The seal provided by the ring 100 and the cooperating shoulder of the crank shaft 97 is of importance. Since crank case compression is utilized to charge the combustion spaces of the cylinders 48, one compartment 101 of the cylinder is under pressure while the other compartment is under partial vacuum. Under such conditions, objectionable leakage between the two compartments will occur unless carefully guarded against. The seal provided by the shoulder of crank shaft 97 seating on the upper face of bearing ring 100 effectively prevents any objectionable leakage between the crank case compartments 101.

The outer crank case section 92 is provided, at its outer side, with an appropriately disposed and formed pad 102 (Figures 11 and 12) having therein passages 103 respectively opening into the compartments 101. Each of the passages is controlled by an outwardly opening and inwardly closing poppet valve 104. An intake passage and spring housing member 105 is bolted to pad 102, at the outer face thereof, with an intervening gasket 106. Member 105 is provided with pockets 107, which receive compression springs 108 urging the valves 104 closed, and with a neck 109 having an intake passage 110 opening into the spring pockets 107, which overlie and open directly into the respective valve pockets 111 of pad 102. The outer end of neck 109 is adapted for bolting thereto a stack of a curburetor (not shown). The valves 104 are actuated in opening direction by cam followers 112 pivotally mounted in the crank case and operated by appropriately disposed cams 113 on the cam shaft 97. The valves 104 and associated parts, above described, constitute the subject matter of my Patent No. 2,289,201, issued July 7, 1942, and need not be further described here. The provision of means for admitting the combustible fuel mixture directly to the crank case compartment, or compartments, has an important bearing on the disposition of the exhaust gas recess 74, as will appear more fully presently. Within the broader aspects of my present invention, any suitable means may be provided for admitting the combustible fuel mixture directly into the crank case, though I preferably employ the means disclosed in my above identified patent and briefly described above.

The cylinder block 46 has formed therein, at the opposite side thereof from recess 74, two transfer passages 114 (Figure 11) flaring toward and respectively opening at one end into the crank case compartments 101. Passages 114 open at their other ends into hollow rectangular bosses 115 formed integral with block 46. The outer faces of bosses 115 are flat and formed to provide seating surfaces on which closure plates 116 seat, with intervening gaskets 117. The plates 116 are secured to bosses 117 in a suitable manner, conveniently by screws 118, and effectively close the outer sides thereof. Inlet ports 119 are bored through the walls of the respective cylinders 48, to which ready access is had through the bosses 115, these ports 119 opening directly into the transfer passages 114, as will be clear. Also, exhaust ports 120 are bored through the walls of cylinders 48, at the opposite side thereof from inlet ports 119 and somewhat nearer the outer ends of the cylinders than inlet ports 119. The recess 74 in the cylinder block 46 gives ready access to the cylinders 48 for boring the exhaust ports 120 therein, as will be clear. Pistons 121 operate in cylinders 48 and have operating connection, by means of connecting rods 122, to the crank shaft 97. Each piston is provided, at its outer or head end, with an appropriately formed extension 123 for deflecting the entering fuel-air mixture charge toward the outer end of the cylinder and causing displacement therefrom of the burned gases to and through the exhaust outlet.

Figures 3, 5:
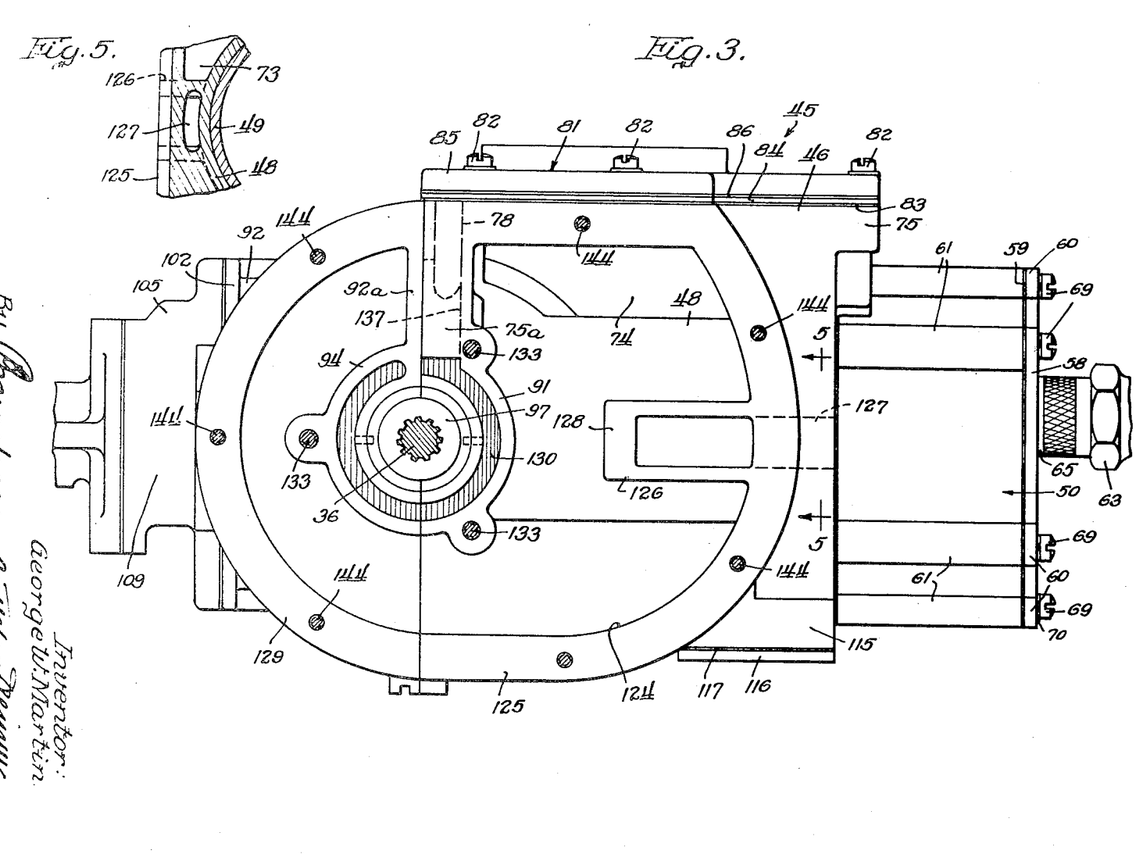
Figure 3 is an underneath view of the engine.
Figure 5 is a fragmentary sectional view taken substantially on line 5—5 of Figure 3.

The provision of means for admitting the combustible fuel-air mixture charge directly to the crank case compartments renders it possible to have the water outlet passage 80 at the top of cylinder block 46, with the transfer passages 114 and the recess 74 at opposite sides thereof. The recess 74 may thus be disposed to best advantage, with the exhaust ports 120 opening directly into its outer end. Further, the recess 74 may have an outlet opening 124 of ample size, directly through the bottom of cylinder block 46 and its associated crank case section 47, disposed within the area enclosed by a seating surface 125 (Figure 3), formed on the bottom of cylinder block 46 and crank case section 47, conforming to the seating surface of the rearward or stern portion of flange 38 of mounting plate 26. The cylinder block 46 is also provided, at the bottom thereof within seating surface 125, with a downwardly opening hollow rectangular boss 126 (Figures 3, 12, 13 and 14) from which a water inlet passage 127, extending outward along the under side or bottom of block 46, opens into the cylinder water jacket 73. The bottom of boss 126 provides a seating surface 128 flush with and supplementary to seating surface 125, and the bottom of crank case section 92 is provided with a seating surface 129 constituting a continuation of seating surface 125 and conforming to the seating surface of the forward portion of flange 38 of mounting plate 26. The engine block and crank case assembly is thus provided, at the bottom thereof, with a seating surface, comprising the surfaces 125 and 129, conforming to, and adapted to seat accurately upon, the upper face of flange 38.

The bearing sleeve at the bottom of the crank case, comprising the bosses 91 and 94, is provided with a downwardly opening annular channel 130. A plate 131 seats on the bottom of the bosses 91 and 94, with an intervening gasket 132, to which it is suitably secured, conveniently by screws 133 threading into suitably disposed bosses. The plate is provided with an arcuate opening 134 (Figure 13) underlying channel 130 and in register with a like opening in gasket 132. Opening 134 is disposed outward beyond a cylindrical neck 135 depending from plate 131. A tube 136 is secured at its upper end, in neck 135 and extends therefrom downward. When the engine is mounted on plate 26, tube 136 extends downward about drive shaft 36, the upper end of which is splined to the lower end of crank shaft 97, into the upper portion of motor support tube 23, in concentric spaced relation thereto and to shaft 36. A recess 137 is formed in an extension 75a of wall 75 (Figure 3) and opens into the lower end of channel 78 and into the annular channel 130, establishing communication therebetween. The outer side of recess 137 is closed by extension 92a of crank case section 92.

The mounting plate 26 is provided, at the after or stern portion thereof with an upwardly opening hollow boss 138 (Figures 12, 13 and 14) substantially rectangular in plan, the top of which is flush with the upper face of flange 38 and provides a seating surface 138a supplementary thereto. The forward or inner end wall 139 of boss 138 is provided with a slot 140 opening through its top, and boss 138 is also provided interiorly thereof, with a groove 141 of rectangular cross section, extending along its sides and bottom at the outer face of end wall 139. A sealing block or grommet 142, of rubber or like material fits in groove 141. The upper end portion of the water supply tube 42 is curved outward or rearward through an arc of approximately 90° extends through slot 140, and fits snugly through grommet 142 with its end adjacent the outer face of grommet 142 flared radially outward at 143.

As will be clear from Figures 3, 12, 13 and 14, seating surfaces 125, 126 and 129, at the bottom of the cylinder block and crank case assembly, provide a continuous seating surface area which conforms to the seating surface area of flange 30 of mounting plate 26 and the top of boss 138. The cylinder block and crank case assembly is suitably bored and tapped, in the area of the seating surfaces 125 and 129 thereof, for reception of headed screws 144 passing through flange 38 of plate 26, there being spring lock washers 145 interposed between the heads of screws 144 and the underface of flange 38. The engine may thus be mounted upon the mounting plate 26 with expedition and facility, with a sealing gasket 146 disposed between the seating surfaces thereof. Gasket 146 may be provided with an extension conforming to the opposed seating surfaces of the bosses 126 and 138, disposed therebetween.

The grommet 142, when uncompressed, extends a slight distance above boss 138. When the engine is pulled into tight seating engagement with flange 38 of plate 26, by screws 144, grommet 142 is compressed and forced tightly about the water supply tube 42 and into tight contact with the walls of groove 141 and the outer face of end wall 139 of boss 138. Grommet 142 then provides a water tight and pressure resistant seal about tube 42 and with boss 134, and also secures the end of tube 42 tightly in position effectively holding it against any objectionable looseness or play. By removing the screws 144 the engine and the parts carried thereby, constituting therewith the power head, may be lifted as a unit from the mounting plate 26. The water supply tube 42 may then readily be withdrawn through the motor support tube 23, for inspection, cleaning, repair or replacement. By removing the bolts 68, the cylinder head 50 may be removed as a unit from the cylinder block 46 and readily disassembled, and by removing the screws 82 the cover structure 81 may be removed as a unit from wall 75 of cylinder block 46 and readily disassembled. In that manner, access may be had to all of the water spaces and passages of the engine, for removal of sediment therefrom, and for inspection, cleaning, repair or replacement of parts, as may be required. Removal of the cover structure 81 also gives ready access to the exhaust spaces of the engine, and removal of cover plates 116, crank case section 92 and intake passage and spring housing member 105, gives ready access to the transfer passages and intake ports and all interior parts of the engine, for inspection, repair or replacement. It will be seen that the engine may be disassembled with expedition and facility, giving ready access to all parts and passages thereof, and may be as quickly and easily reassembled, which is conducive to easy servicing and maintenance of the engine in the best operating condition assuring maximum efficiency thereof.

The wall 75 and the cover structure 81 mounted thereon define, with recess 74 of cylinder block 46, an expansion chamber, of adequate volume, for the exhaust gases discharged from the cylinders 48 directly into that chamber through the exhaust ports 120. When the engine is mounted on plate 26, the exhaust expansion chamber opens directly into that plate, through opening 124, as will be clear, and tube 136 extends downward about drive shaft 36 into the upper portion of motor support tube 23, in concentric spaced relation to both thereof.

In the operation of the engine, when the unit 20 is in use, the pump 38 delivers water under appropriate pressure to the water supply tube 42. The water is discharged from tube 42 into boss 138, from which it flows through boss 128 and passage 127 to the bottom of the cylinder water jacket space 73 and thence into the space 66. The water then flows upward about the cylinders and across the heads thereof, and enters the passage 80 at the top of cylinder block 46. From passage 80 the water flows through the drilled openings or passages 79 into the top of channel 77 of wall 75 and downward in channel 77 to opening 88 in plate 84 of cover structure 81. The water then flows upward in cover structure 81 to the top opening 89 in plate 84, thence into the top of channel 78 of wall 74, downward in channel 78 to the bottom thereof, thence through passage 137 into channel 130. From channel 130 the water is discharged, through opening 134 of plate 131, downward about tube 136 into mounting plate 126 and thence into the motor support tube 23.

It will be seen that the flow of the cooling water in the manner stated guards against creation of air pockets—potential steam pockets—in the engine cooling system, while assuring adequate cooling of the engine. The extensive water cooling of the exhaust expansion chamber serves to cool the exhaust gases quickly, thereby materially reducing the volume thereof and effectively preventing objectionable back pressure in the exhaust passages of the engine. The water flowing through channel 130 and thence downward about tube 136, effectively guards the bottom crank shaft bearing against objectionable heating by the exhaust gases. It also further cools and condenses the exhaust gases while tending to produce a partial vacuum or suction effect in the expansion chamber, which contributes to prevention of objectionable back pressure in the exhaust passages of the engine and to increased efficiency thereof. The exhaust gases discharged into mounting plate 26 mix with the water flowing down the motor support tube 23. The mixture of water and exhaust gases flows from tube 23 into intermediate section 22 of unit 20 and is discharged therefrom under water, through opening 43, as will be clear from what has been said.

The crank case section 47 flares generally away from the cylinder block 46, the transfer passages 114 are straight lengthwise and open into and flare toward crank case section 47, and water passages 80 and 127 are straight lengthwise and flare toward and open through the outer end of cylinder block 46. Likewise, all other passages and recesses in the cylinder block, except the drilled passages or openings are appropriately formed and disposed to provide draw for die casting, and all seating surfaces on the cylinder block 46 and appurtenant parts are flat and, in general, perpendicular to other seating surfaces, to facilitate machining thereof. The cylinder block and crank case unit of the engine is thus well suited to production by die casting, and such machining of surfaces thereof as may be required can be performed quickly and easily. Likewise, the cylinder head 50 is well suited for die casting, as is the crank case section 92, and the cover plates, except plate 85, which may readily be die cast, may readily be produced as simple stampings. It will be seen that the engine of my instant invention is so designed and constructed that the stationary parts thereof may readily be produced by die casting, or by stamping, require but little machining, which may be performed with expedition and facility, and may be quickly and easily assembled, rendering it possible to produce an engine of exceptionally high efficiency at comparatively low cost.

It will be understood that changes in detail may be resorted to, without departing from the field and scope of my invention, and I intend to include all such variations, as fall within the scope of the appended claims, in this application in which the preferred form only of my invention is disclosed.

I claim:

1. In an internal combustion engine of the character described, a cylinder block comprising a body portion having a crank case section at one end and provided with cylinder sleeves projecting outward beyond its other end, a cylinder head removably secured to said block comprising an outer end wall structure closing the outer ends of said sleeves and a flange extending outwardly and inwardly beyond said end wall structure seating on the outer end of the body portion of said block extending about the outer portions of said sleeves in spaced relation thereto defining therewith a water jacket, and a removable head plate seating on the outer end of said flange providing therewith and with said end wall structure a water jacket extending across the outer end of said cylinder head, said end wall structure having openings therethrough into said first water jacket and said block having therein cooling water inlet and outlet passages opening into and from said first water jacket.

2. In an internal combustion engine of the character described, a cylinder block, a vertically disposed crank case at one end of said block, horizontally disposed water jacketed cylinders extending from the other end of said block, said crank case having at its lower end an opening for reception of a crank shaft bearing with a downwardly opening channel surrounding said opening and said block and crank case having at the lower end thereof a seating surface surrounding said opening remote therefrom, said block having an expansion chamber for exhaust gases opening at its lower end within the area enclosed by said seating surface and defined in part by a wall of channel formation projecting outward beyond the block separated interiorly into two channels one of which opens into said channel surrounding said bearing opening, and a hollow cover structure seating on said wall closing the outer side of said expansion chamber having two openings communicating respectively with said channels of said wall, said cylinders having exhaust ports opening into said expansion chamber, said block having an upper passage establishing communication between the cylinder water jacket and the other of said channels of said wall and a lower passage opening at one end into said water jacket and at its other end through said block within said area.

3. In an internal combustion engine of the character described, a cylinder block, a vertically disposed crank case at one end of said block, and horizontally disposed water jacketed cylinders extending from the other end of said block, said crank case having at its lower end an opening for reception of a crank shaft bearing with a downwardly opening channel surrounding said opening and said block and crank case having at the lower end thereof a seating surface surrounding said opening remote therefrom, said block being provided with water outlet passages establishing communication between the cylinder water jacket and said channel and having an expansion chamber for exhaust gases opening through its lower end within the area enclosed by said seating surface and said cylinders having exhaust ports opening into said chamber, said block also having a boss within said area having an outer seating surface and a passage opening through the outer face of said boss and into the cylinder water jacket.

4. In an internal combustion engine utilizing crank case compression for charging the combustion space, a cylinder block, a vertically disposed crank case at one end of said block, and horizontally disposed water jacketed cylinders extending from its other end, said crank case having at its lower end an opening for reception of a crank shaft bearing with a downwardly opening channel surrounding said opening and said block and crank case having at the lower end thereof a seating surface surrounding said opening remote therefrom, said block having at one side thereof transfer passages opening from said crank case into said cylinders and at its opposite side an exhaust gas expansion chamber opening through the lower end of said block within the area enclosed by said seating surface, said cylinders having exhaust ports opening into said chamber, said block having at its top a water outlet passage opening from the cylinder water jacket in communication with said channel and at its lower end a boss within said area and a water inlet passage opening through said boss and into the cylinder water jacket.

5. In an internal combustion engine utilizing crank case compression for charging the combustion space, a cylinder block, a vertically disposed crank case at one end of said block having an intake port opening into said crank case for admitting thereto combustion supporting fluid, and a horizontal cylinder extending from the other end of said block, said crank case having at its lower end an opening for reception of a crank shaft bearing and said block and cylinder having at the lower end thereof a seating surface surrounding said opening remote therefrom, said block having an exhaust gas expansion chamber opening through its lower end within the area enclosed by said seating surface, said cylinder having an exhaust port opening into said chamber.

6. In an internal combustion engine utilizing crank case compression for charging the combustion space, a cylinder block, a vertically disposed crank case at one end of said block having an intake port opening into said crank case for admitting thereto combustion supporting fluid, and a horizontal cylinder extending from the other end of said block, said crank case having at its lower end an opening for reception of a crank shaft bearing and said block and cylinder having at the lower end thereof a seating surface surrounding said opening remote therefrom, said block having at the upper side thereof a transfer passage opening from said crank case into said cylinder and at its lower side an exhaust gas expansion chamber opening through its lower end within the area enclosed by said seating surface, said cylinder having an exhaust port opening into said chamber.

7. In an outboard motor unit, a structure comprising a motor support tube mounted to permit turning movement of said unit, said structure having an underwater discharge opening communicating with the lower end of said tube, a recessed upwardly opening mounting plate fixed on the upper end of said tube opening thereinto, and an internal combustion engine mounted on said plate comprising a cylinder block with a vertical crank case at one end and a horizontal cylinder extending from its other end, said crank case having an intake port opening into said crank case for admission thereto of combustion supporting fluid and said block having at one side thereof a transfer passage opening from said crank case into said cylinder and at its opposite side an exhaust gas expansion chamber with its lower end overlying and opening downward into said plate, said cylinder having an exhaust port opening into said chamber.

8. In an outboard motor unit, a structure comprising a motor support tube mounted to permit turning movement of said unit, said structure having an underwater discharge opening communicating with the lower end of said tube, a recessed upwardly opening mounting plate fixed on the upper end of said tube opening thereinto, an internal combustion engine mounted on said plate comprising a cylinder block with a vertical crank case and a crank shaft therein at one end of said block and a horizontal water jacketed cylinder extending from the other end of said block, said crank case having at its lower end a downwardly opening channel surrounding the lower end of said crank shaft substantially concentric with and overlying the upper end of said tube, a drive shaft coupled to the lower end of said crank shaft extending therefrom downward through said supporting tube, said block having an exhaust gas expansion chamber with its lower end overlying and opening downward into said plate, a closure plate secured on the lower end of said crank case, a tube secured to said closure plate extending therefrom downward in said support tube about said drive shaft in spaced relation thereto and to said support tube and spaced inward from said channel, said closure plate having a restricted opening underlying said channel and otherwise closing the lower end thereof, said block having water outlet passages communicating with the cylinder water jacket and said channel, and a pump carried by said unit having an underwater intake and having its discharge connected to the cylinder water jacket.

9. In an outboard motor unit of the character described, a structure comprising a water pump and a motor support tube above said pump having at its upper end a mounting plate provided with an upwardly opening hollow boss, said boss having an upwardly opening slot therein, a water supply tube fitting at its lower portion in said structure in communication with the discharge of said pump extending therefrom upward through said motor support tube and opening at its upper end into said boss, a water jacketed engine mounted on said plate having a downwardly opening hollow boss seating on said boss of said plate and opening into the water jacket of said engine, and an elastic sealing member fitting within the boss of said plate bridging said slot and fitting about said tube, said sealing member being compressed between said bosses providing a water tight seal therebetween and about said tube.

10. In an outboard motor unit of the character described, a structure comprising a water pump and a motor support tube above said pump having at its upper end a mounting plate provided with an upwardly opening hollow boss, said boss having an upwardly opening slot in its wall and an interior groove contiguous to said slot, a water supply tube fitting at its lower portion in said structure in communication with the discharge of said pump extending therefrom upward through said motor support tube with its upper portion bent substantially at right angles and inserted in said slot, an elastic sealing member bridging said slot and fitting about the upper end of said water supply tube and seating in said groove, and a water jacketed engine mounted on said plate having a downwardly opening hollow boss seating on said boss of said plate and on said sealing member maintaining the latter compressed about said water supply tube and in said slot in sealing engagement therewith, said boss of said engine opening into the water jacket thereof.

GEORGE W. MARTIN.

REFERENCES CITED

The following references are of record in the file of this patent:

UNITED STATES PATENTS

| Number | Name | Date |
| --- | --- | --- |
| 819,258 | Weiss | May 1, 1906 |
| 1,330,409 | Taylor | Feb. 10, 1920 |
| 1,488,272 | Milner | Mar. 25, 1924 |
| 1,529,812 | Reineke | Mar. 17, 1925 |
| 1,671,387 | Trotman | May 29, 1928 |
| 1,860,769 | Buchi | May 31, 1932 |
| 1,910,561 | Pierce | May 23, 1933 |
| 2,224,900 | Conover | Dec. 17, 1940 |
| 2,227,247 | Conover | Dec. 31, 1940 |
| 2,264,365 | Conover | Dec. 2, 1941 |
| 2,346,148 | Bosma | Apr. 11, 1944 |